United States Patent Office 3,250,676
Patented May 10, 1966

3,250,676
METHOD OF INCREASING SODIUM CHLORIDE EXCRETION
Adolf Stachel and Rolf-Eberhard Nitz, Frankfurt am Main, Fechenheim, Germany, assignors to Cassella Farbwerke Mainkur Aktiengesellschaft, Frankfurt am Main, Fechenheim, Germany, a Germany company
No Drawing. Filed Feb. 24, 1960, Ser. No. 10,567
Claims priority, application Great Britain, Oct. 28, 1959, 36,649/59
5 Claims. (Cl. 167—51.5)

The present invention relates to compositions useful for combatting edemae of various types, such as edema in cases of cardiac insufficiency, renal insufficiency and congestion of the portal vein (e.g., liver cirrhosis). More particularly, this invention relates to such compositions in which the active ingredient is 4-chloro-benzene-1,3-disulfonamide.

It is known that the causes of such edema are of various kinds. The application of medicaments aims at the redress of the edema. This is achieved most simply and practically by administration of diuretics. Thus, especially mercury-containing organic compounds which have a strong diuretic action have been administered for curing edema. The disadvantage of these mercury-containing compounds lies in undesired and hazardous side effects, such as "acute dehydration" with its consequences, such as thrombosis and disturbances of electrolyte metabolism. Consequently, the development of a suitable diuretic free from mercury has been a significant objective of pharmaceutical research.

The diuretic action of sulfonamide compounds is already known. Even the simple sulfanilamide has a diuretic effect. (Schwarz, W. B., New Engl. J. Med. 240, 173/1949.) The therapeutic scope of action of this compound is, however, quite insufficient for the treatment of human beings. In 1950, 2-acetylamino-1,3,4-thiadiazole-5-sulfonamide of the formula:

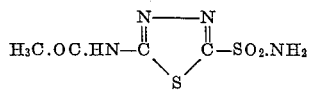

was introduced into therapy. Regarding the clinical use, this compound involves the disadvantage that, on the one hand, it causes a diuresis of bicarbonate instead of a diuresis of chloride and on the other hand the administration thereof results not only in the excretion of sodium but also, to a great extent, of potassium. It is also known that benezene-1,3-disulfonamides show a diuretic action (J.A.C.S., 79, 2028).

When investigating the diuretic action of numerous benzene-1,3-disulfonamides, we found that 4-chloro-benzene-1,3-disulfonamide possessed an unforeseeable optimum diuretic effect. Moreover, it was surprising that the effect of this simple chemical compound even surpasses 5- or 6-fold the effect of 6-chloro-7-sulfon-amido-1,2,4-benzothiadiazine-1,1-dioxide (chlorothiazide) of the formula:

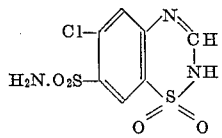

(J.A.C.S., 79, 2028) which has recently been marketed as a diuretic agent of excellent action.

The new compositions are useful for curing edema of various geneses with a high degree of success. Not only has the effectiveness been found for animals such as rats and dogs, but clinical tests on human beings are also being done. Significant results of animal tests and in the treatment of human beings are given in the following Examples 1–3.

4-chlorobenzene-1,3-disulfonamide is a well-known compound and may be prepared by various known methods (see: Beilstein, edition 4, supp. volume XI, page 49—Olivier, R. 37, page 311 and Beilstein, edition 4, 2nd supp. volume XI, page 113—Davies, Wood, J. Chem. Soc., 1928, page 1125). It forms colourless crystals melting at 217–219° C. which are difficult to dissolve in water. However, the excellent physiological and pharmaceutical properties of the 4-chlorobenzene-1,3-disulfonamide have not heretofore been investigated, nor has the compound been used for any therapeutic purposes.

One object of the present invention is to provide 4-chlorobenzene-1,3-disulfonamide compositions for use in curing edemae of various geneses. According to the invention, these 4-chlorobenzene-1,3-disulfonamide compositions, which contain not less than 0.2% by weight of the disulfonamide may be prepared as solid materials and may take the form of tablets, powder, capsules, or any other solid dosage form which is useful for oral administration. The compositions may be admixed with solid tabletting adjuvants, such as starch, lactose and talc. Any of the tabletting materials used in pharmaceutical practice may be employed as long as there is no incompatibility with 4-chlorobenzene-1,3-disulfonamide. When using the disulfonamide in solid dosage unit form, the dosage units preferably contain at least 20 milligrams disulfonamide, suitably 20–500 milligrams disulfonamide. Alternatively, the 4-chlorobenzene-1,3-disulfonamide with its adjuvant material may be placed in the usual capsule of resorbable material, such as the usual gelatine capsule. The active ingredient may also be prepared in form of suspension in a material in which the 4-chlorobenzene-1,3-disulfonamide is insoluble and may be administered in that form. As suspending agent or emulsifier, materials such as ethylene glycol, proteins, polysaccharides or lecithin, should be used.

Furthermore, we have found that stable parenteral aqueous solutions of 4-chlorobenzene-1,3-disulfonamide may also be prepared by adding hydroxy-amines, such as N-methylglycosamine, diethanolamine or diethylaminoethanol as dissolving intermediary in molecular proportions, referred to the sulfonamide groups. The solutions have only a slightly alkaline pH and are, therefore, well suited for parenteral use, that is, by injection.

This invention will be more fully set forth in the following more detailed description which includes examples that are given as illustrative embodiments of the invention and not as limitations thereof.

Example 1

2 test groups of rats with a body-weight ranging between 150–200 grams were fed orally with 2.5 cm.³ of a physiological salt solution after a 14 hour fasting period, the first group (control) receiving the pure physiological salt solution and the second group receiving the investigation material dissolved in the physiological salt solution.

The rats were kept in cages specially constructed to collect all the urine. The total quantity of urine was measured after 6 hours and the sodium and potassium content in this urine was determined flame-photometrically and the chlorine content titrimetrically. For doubling the urine excretion over the control group 2 mg./kg. 4-chlorobenzene-1,3-disulfonamide and 10 mg./kg. chlorothiazide, respectively, were required as test materials. With this dosage, the amount of the sodium and chlorine excretion was also doubled in comparison with the control group. Whereas the amount of the potassium excretion was increased by only 30% after administration of 4-chlorobenzene-1,3-disulfonamide, an increase of 65% was observed after administering chlorothiazide.

Example 2

After catheterization of trained female dogs which were subjected to the Pflaumer type operation for exposure of their urethrae, their urine excretion was measured hourly up to 6 hours.

During these tests, 0.5 mg./kg. 4-chlorobenzene-1,3-disulfonamide and 2.5 mg./kg. chlorothiazide showed the same diuretic effect. Thus, it follows that 4-chlorobene-1,3-disulfonamide shows a 5-fold action as compared with chlorothiazide.

Example 3

In two different clinics 32 patients were treated and received 2 tablets containing each 200 milligrams 4-chlorobenzene-1,3-disulfonamide. A loss of their weight of more than 1 kg. on average (in the maximum case of 2.8 kilograms) was observed within a period of one to two days. In most of the cases, the diuresis was still being increased distinctly even on the second day after treatment. The further result of the patients' treatment was that the sodium excretion increased 4-fold, the chlorine excretion 3-fold, whereas the nonprotein nitrogen content in the serum, the blood picture, the serum lability tests and the urine status remained unchanged in all instances and no allergic symptoms were observed.

Comparative examinations also proved that the potassium level declines to a smaller extent than that after administration of chlorothiazide compositions. In some cases of liver cirrhosis where the patients showed no reaction after administration of chlorothiazide compositions, significant diuresis could be obtained by administration of 4-chlorobenzene-1,3-disulfonamide.

Example 4

2.705 grams (=$\frac{1}{100}$ mol) 4-chlorobenzene-1,3-disulfonamide and 3.8 grams (=$\frac{1}{50}$ mol) N-methyl-glycosamine were made up with water to a weight of 100 grams and completely dissolved by a slight warming up. The solution remained clear even when place on ice and kept stable for several months. It is well suited for parenteral application.

Example 5

A solution of 2.705 grams (=$\frac{1}{100}$ mol) 4-chlorobenzene-1,3-disulfonamide and 2.1 grams (=$\frac{1}{50}$ mol) diethanolamine was prepared according to Example 4, said solution being stable and well suited for injection purposes.

Example 6

A solution of 2.705 grams (=$\frac{1}{100}$ mol) 4-chlorobenzene-1,3-disulfonamide and 2.34 grams (=$\frac{1}{50}$ mol) diethylamino-ethanol was prepared as described above. This solution possesses properties similar to those of the solutions described in Examples 4 and 5.

It will be understood that this invention is susceptible to further modification and, accordingly, it is desired to comprehend such modifications within this invention as may fall within the scope of the appended claims.

We, therefore, particularly point out and distinctly claim as our invention:

1. A method of increasing sodium chloride excretion by diuresis in a patient afflicted with edemae, said method comprising the step of administering 4-chlorobenzene-1,3-disulfonamide to the patient.

2. A method of increasing sodium chloride excretion by dieuresis in a patient afflicted with edemae, said method comprising the step of administering to said patient, a composition in unit dosage form comprising as its essential active ingredient 20–500 mg. of 4-chlorobenzene-1,3-disulfonamide and a pharmaceutical carrier.

3. A method of increasing sodium chloride excretion by disuresis in a patient afflicted with edemae, said method comprising the step of administering to said patient, a composition in unit dosage form containing as its essential active ingredient 4-chlorobenzene-1,3-disulfonamide, a parenteral pharmaceutical carrier and a solubilizer for said 4-chlorobenzene-1,3-disulfonamide.

4. The method of claim 3 wherein the solubilizer is selected from the group consisting of N-methyl glycosamine, diethanolamine and diethylaminoethanol.

5. The method of claim 3 wherein the solubilizer is an hydroxy amine, and is present in the composition in a molar ratio of 1:1 referred to sulfonamide groups.

References Cited by the Examiner

UNITED STATES PATENTS 2,578,761  12/1951  Sweet et al. _____ 167—51.5 X
2,835,702  5/1958  Schultz _____ 167—51.5 X

OTHER REFERENCES

Beilstein, Handbuch, vol. 11, Zweites Ergans (1950), p. 113.

Chemical Abstracts, vol. 36, page 1916(3), (1942).

FRANK CACCIAPAGLIA, JR., Primary Examiner.

MORRIS O. WOLK, IRVING MARCUS, LEWIS GOTTS, Examiners.